Patented June 6, 1944

2,350,326

UNITED STATES PATENT OFFICE 2,350,326

CONDENSATION PRODUCT OF p-HYDROXY BENZOIC ACID

Russell B. Du Vall and Ernest F. Grether, Midland, Mich., assignors to The Dow Chemical Company, Midland, Mich., a corporation of Michigan No Drawing. Application April 26, 1941,
Serial No. 390,608

8 Claims. (Cl. 260—78)

This invention concerns certain new synthetic resins, particularly resinous condensation products of p-hydroxy benzoic acid and polyhydric alcohols.

The new resins are prepared by heating, preferably under vacuum, a mixture of p-hydroxy benzoic acid and one or more polyhydric alcohols at temperatures sufficiently high to remove the water formed by the condensation reaction. Temperatures between 150° and 225° C. are satisfactory. The higher temperatures within this range have the advantage of decreasing the time necessary for complete resinification, but the disadvantage of darkening the product. A small quantity of an acid catalyst, such as benzene sulfonic acid, may be added. If desired, the reaction may be carried out at temperatures below 150° C. to form an ester of p-hydroxy benzoic acid and the polyhydric alcohol and the ester may thereafter be heated at higher temperatures to obtain a resinous product. The products can be adapted to a variety of uses, but they are particularly adapted for use in protective coatings or films, especially in combination with ethyl cellulose.

The resinous products vary in properties from highly-viscous liquids to thermoplastic brittle, and in some cases crystalline, solids. These properties may be modified, however, by the incorporation of other compatible resins, or fillers, plasticizers, etc. The nature of the final product is influenced somewhat by the particular polyhydric alcohol used, the molal ratio of acid to alcohol, the time and temperature of heating, and the quantity of catalyst. Polyhydric alcohols generally may be used, but we have found glycols, such as ethylene glycol; polyglycols, such as diethylene glycol; and trihydric alcohols, such as glycerol, to be particularly suitable. Such alcohols may be used in equimolar proportions with the p-hydroxy benzoic acid, the resulting resin usually being a solid when glycols or trihydric alcohols are used and a liquid when polyglycols are used. Increases in the proportion of alcohol tend toward production of soft or liquid resins, whereas increases in the temperature, time of heating, and amount of catalyst all tend toward production of hard brittle resins.

The magnitude of these effects is illustrated in the following examples, which, however, are not to be construed as limiting the invention:

Example 1

A mixture of 100 grams of p-hydroxy benzoic acid, 80 grams of ethylene glycol, and 1 gram of benzene sulfonic acid was heated on an oil bath at 165° C. for 11 hours. A loss in weight of 46 grams occurred, due largely to the evolution of water. The product was a very viscous liquid which poured slowly at 20° C.

Example 2

A mixture of 100 grams of p-hydroxy benzoic acid, 45 grams of ethylene glycol, and 1 gram of benzene sulfonic acid was heated at 165° C. for 11 hours with a loss in weight of 36.5 grams. The product was a crystalline solid. On continued heating of the solid for an additional 22 hours at 165° C. there was a further loss in weight of 41 grams, but the appearance of the crystalline solid remained unchanged.

Example 3

A mixture of 100 grams of p-hydroxy benzoic acid, 80 grams of ethylene glycol and 0.5 gram of benzene sulfonic acid was heated for 1.5 hours at 165° C. under 1 atmosphere pressure, then for 1.5 hours at 165° C. and 0.2 inch pressure, and then for 12 hours at 165° C. and 0.2 inch pressure. There was a loss in weight of 31.5 grams and the product was a very soft and sticky semisolid. An additional 0.60 gram of benzene sulfonic acid was added and the product heated at 200° C. under 5 mm. pressure for 12 hours. A further loss in weight of 20 grams occurred. The product lost its stickiness and became a hard solid resin.

Example 4

A mixture of 100 grams of p-hydroxy benzoic acid, 137 grams of diethylene glycol, and 1 gram of benzene sulfonic acid was heated at 165° C. for 11 hours. There was a loss in weight of 47 grams during the reaction and a very viscous liquid resin was produced. 183 grams of the product was heated under a vacuum at 180–200° C. for one hour. A further loss of 39 grams occurred. The new product was a sticky solid which flowed perceptably in one hour at 20° C.

Example 5

A mixture of 100 grams of p-hydroxy benzoic acid, 77 grams of diethylene glycol, and 1 gram of benzene sulfonic acid was heated at 165° C. for 11 hours. A loss in weight of 30.5 grams occurred. The product was a viscous liquid. The latter was heated for an additional 22 hours at 165° C. and a further loss in weight of 37.5 grams occurred. The new product was a sticky semisolid which poured very slowly. The semisolid was heated for six hours at 165° C. and a pressure of 0.8–1.5 inches. A further loss in weight of 6 grams occurred. The product was still somewhat sticky and easily dented at 30° C.

*Example 6*

A mixture of 100 grams of p-hydroxy benzoic acid, 165 grams of glycerol, and 1 gram of benzene sulfonic acid was heated at 165° C. for 11 hours. There was a loss in weight of 46 grams and the product was a brittle, glassy, and slightly tacky solid. 84 grams of the solid was heated at 167° C. at 2.5 inches pressure for 2 hours and 10 minutes. Water was evolved freely at first, indicating the desirability of preparing this resin under vacuum. The product was a brittle solid which was no longer tacky.

*Example 7*

A mixture of 100 grams of p-hydroxy benzoic acid, 67 grams of glycerol, and 1 gram of benzene sulfonic acid was heated at 165° C. for 11 hours with a loss in weight of 25.0 grams. The product was a glassy solid. The solid was further heated for an additional 22 hours at 165° C. and a further loss in weight of 28.5 grams occurred. However, there was no change in appearance in the product.

*Example 8*

A mixture of 100 grams of p-hydroxy benzoic acid, 35 grams of glycerol, and 1.32 grams of benzene sulfonic acid was heated for 2 hours at 180° C. and 7–10 mm. pressure. The product was very brittle. 29 grams of glycerol was added and the material heated 3 hours longer at 180° C. and 7 mm. pressure. The resin was still hard and brittle. A loss in weight of 31 grams occurred in the 5-hour period at 180° C.

We claim:

1. A resinous condensation product formed by heating a mixture containing para-hydroxy benzoic acid and a polyhydric alcohol, as the only ingredients reactive to form said resinous condensation product, at a temperature between about 150° C. and about 225° C. for a time necessary for resinification.

2. A resinous condensation product formed by heating a mixture containing para-hydroxy benzoic acid and a glycol, as the only ingredients reactive to form said resinous condensation product, at a temperature between about 150° C. and about 225° C. for a time necessary for resinification.

3. A resinous condensation product formed by heating a mixture containing para-hydroxy benzoic acid and a polyglycol, as the only ingredients reactive to form said resinous condensation product, at a temperature between about 150° C. and about 225° C. for a time necessary for resinification.

4. A resinous condensation product formed by heating a mixture containing para-hydroxy benzoic acid and a trihydric alcohol, as the only ingredients reactive to form said resinous condensation product, at a temperature between about 150° C. and about 225° C. for a time necessary for resinification.

5. A resinous condensation product formed by heating a mixture containing para-hydroxy benzoic acid and ethylene glycol, as the only ingredients reactive to form said resinous condensation product, at a temperature between about 150° C. and about 225° C. for a time necessary for resinification.

6. A resinous condensation product formed by heating a mixture containing para-hydroxy benzoic acid and diethylene glycol, as the only ingredients reactive to form said resinous condensation product, at a temperature between about 150° C. and about 225° C. for a time necessary for resinification.

7. A resinous condensation product formed by heating a mixture containing para-hydroxy benzoic acid and glycerol, as the only ingredients reacted to form said resinous condensation product, at a temperature between about 150° C. and about 225° C. for a time necessary for resinification.

8. The method which comprises the step of heating a mixture containing para-hydroxy benzoic acid and a polyhydric alcohol as the only reactive ingredients to a temperature between about 150° and about 225° C. for a time sufficient to effect resinification.

RUSSELL B. DU VALL.
ERNEST F. GRETHER.